United States Patent [19]
Tanaka

[11] Patent Number: 5,453,761
[45] Date of Patent: Sep. 26, 1995

[54] INFORMATION PROCESSING APPARATUS

[75] Inventor: Hidekazu Tanaka, Tokyo, Japan

[73] Assignee: Sony Corporation, Tokyo, Japan

[21] Appl. No.: 74,142

[22] Filed: Jun. 9, 1993

Related U.S. Application Data

[63] Continuation of Ser. No. 716,256, Jun. 17, 1991, abandoned.

[30]    Foreign Application Priority Data

Jun. 18, 1990   [JP]   Japan .................................. 2-160275

[51] Int. Cl.$^6$ ................................ G09G 3/02; G06K 9/00
[52] U.S. Cl. ....................... 345/179; 345/112; 345/173; 178/18; 382/187
[58] Field of Search ..................... 364/709.01, 709.11; 178/18, 19; 345/156, 162, 173, 172, 87, 126, 145, 169, 184, 179; 382/13

[56]               References Cited

U.S. PATENT DOCUMENTS

| | | | |
|---|---|---|---|
| 4,839,634 | 6/1989 | More et al. | 340/712 |
| 4,887,230 | 12/1989 | Noguchi et al. | 340/709 |
| 4,947,156 | 8/1990 | Sato et al. | 340/712 |
| 4,951,036 | 8/1990 | Grueter et al. | 340/712 |
| 5,045,844 | 9/1991 | Takano et al. | 345/126 |
| 5,063,600 | 11/1991 | Norwood | 345/173 |

OTHER PUBLICATIONS

"An Overview of a Graphical Multilanguage Applications Environment", IEEE Transactions on Software Engineering, Jun. 1988, pp. 774–785.

*Primary Examiner*—Richard Hjerpe
*Assistant Examiner*—Steven J. Saras
*Attorney, Agent, or Firm*—Hill, Steadman & Simpson

[57]               ABSTRACT

An information processing apparatus (1) has a coordinate data inputting means (31, 32) for sequentially inputting coordinate data by operation of a movable member (6), the coordinate data corresponding to the position of the movable member (6). The movable member is a pen (6), a change of the moving angle of its locus being detected by a detecting means (24) as an angle between the position of the pen (6) and a predetermined base position based on the coordinate data. The base position is displayed on a display (5) as a circular image in the form of a dial on which the pen (6) may be penned down so that a processing means detects the rotating angle of the pen (6) to change a function to be processed. In one arrangement, the circular image acts as a jog control, rotation of the pen (6) causing turning of page numbers.

3 Claims, 10 Drawing Sheets

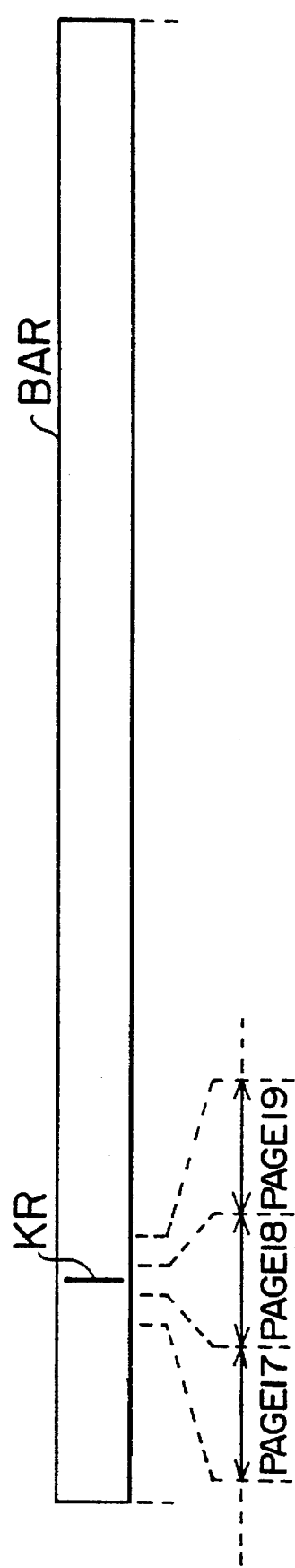
FIG. 2 (PRIOR ART)
FIG. 3 (PRIOR ART)

INFORMATION PROCESSING APPARATUS

This is a continuation of application Ser. No. 716,256, filed Jun. 17, 1991, now abandoned.

This invention relates to information processing apparatus, such as information processing apparatus which is operable to process predetermined information on the basis of coordinate data inputted from suitable means such as a tablet.

In this type of information processing system, it has been proposed to control entry of and changes to various kinds of personal information, such as address book, telephone directory and schedule table, in a similar manner to a pocket book. Such systems are disclosed in the present applicants' European Patent applications Nos. 90313160.5 and 91302530.0 and Japanese Patent Application No 2 (1990)-84318.

In such an information processing system, a display screen H is switched according to the user's selection operation as illustrated in FIG. 1 of the accompanying drawings, and icons 1A, 1B, ... are displayed at the upper margin and the right hand margin of the display screen H.

The user pens down the pen (not shown) on a required icon 1A, 1B, and then the pen is moved to a predetermined position on the display screen H. This causes a window W which corresponds to the selected icon to be displayed at the travelled position, and according to an indication within the window, personal information such as a schedule can be controlled.

In this kind of information processing system, a schedule of a day as inputted is displayed on the whole display screen, and it is convenient for it to be possible to confirm with ease on which one of all the pages the displayed schedule is placed.

Similarly, in the case in which the system is used as a word processor, it is convenient for it to be possible to confirm with ease which one of all the pages is the page being displayed.

As shown in FIG. 2 of the accompanying drawings, it has been proposed for this purpose that a bar chart such as a scroll bar BAR should be displayed, for example, at a lower portion of the display screen, the page displayed being confirmed by the scroll bar BAR.

More specifically, the scroll bar BAR is divided into divisional areas equal to the total number of the pages, such that each divisional area corresponds to each page of the information processing system.

Furthermore, an area KR which corresponds to the displayed page can be indicated with contracting brightness, so that the displayed page is indicated.

When an area corresponding to a particular page is penned down on the scroll bar BAR, the display screen may be switched to the contents of that page, and therefore turning over of pages can be achieved with comparative ease.

However, when the total number of pages is increased as illustrated in FIG. 3 in the case of this technique, each area becomes smaller in width, and hence when switching the display to a desired page by penning down, it becomes increasingly difficult to positively pen down the corresponding area.

For this reason, an increase in page number makes it difficult to positively select pages, resulting in degradation in operation.

According to the present invention there is provided an information processing apparatus comprising: coordinate data input means for inputting coordinate data according to a position of a movable means; processing means for processing said coordinate data; and detecting means for detecting a change of angle between said movable means and a predetermined base position based on said coordinate data so as to change a condition of a predetermined function.

A preferred embodiment of the invention provides an information processing apparatus which is provided with coordinate data inputting means such as a tablet for sequentially inputting coordinate data x and y by operating a movable member such as a pen, the coordinate data corresponding to the position of the movable member. Angle detection means detects a change in the angle from a predetermined reference position towards the movable member on the basis of the coordinate data x and y, and a rotational operation amount of the movable member is inputted on the basis of the detection result of the angle detection means.

By detecting a change in angle from the predetermined reference position to the position of the movable member (detected on the basis of the coordinate data x and y consecutively inputted), the rotational operation amount of the movable member can be positively inputted with ease.

The preferred embodiment accordingly is capable of inputting a rotational operation amount with ease by detecting a change in angle from a predetermined reference position to the position of the movable member on the basis of coordinate data consecutively inputted. The preferred embodiment is therefore capable of positively selecting (or turning over) a required number of pages.

The invention will now be described by way of example with reference to the accompanying drawings, throughout which like parts are referred to by like references, and in which:

FIGS. 2 and 3 are schematic diagrams illustrating the display of a previously-proposed scroll bar;

FIG. 4 shows the overall external appearance of an information processing system 1, which is made portable by arranging casings A and B to be foldable by means of a hinge 2.

Figure 1:
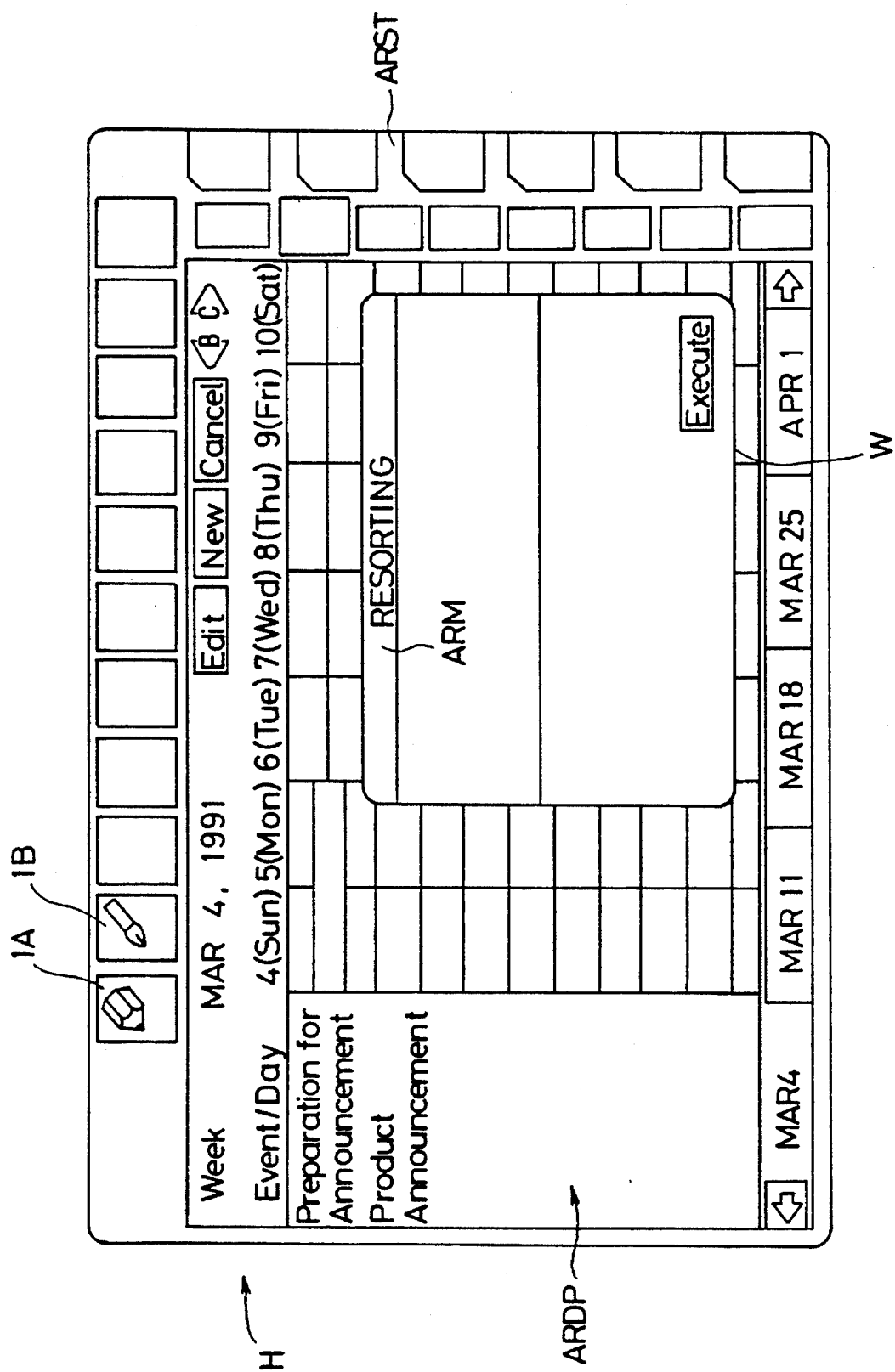
FIG. 1 is a schematic diagram showing the image on a display screen of a previously-proposed information processing system.
Figure 4:
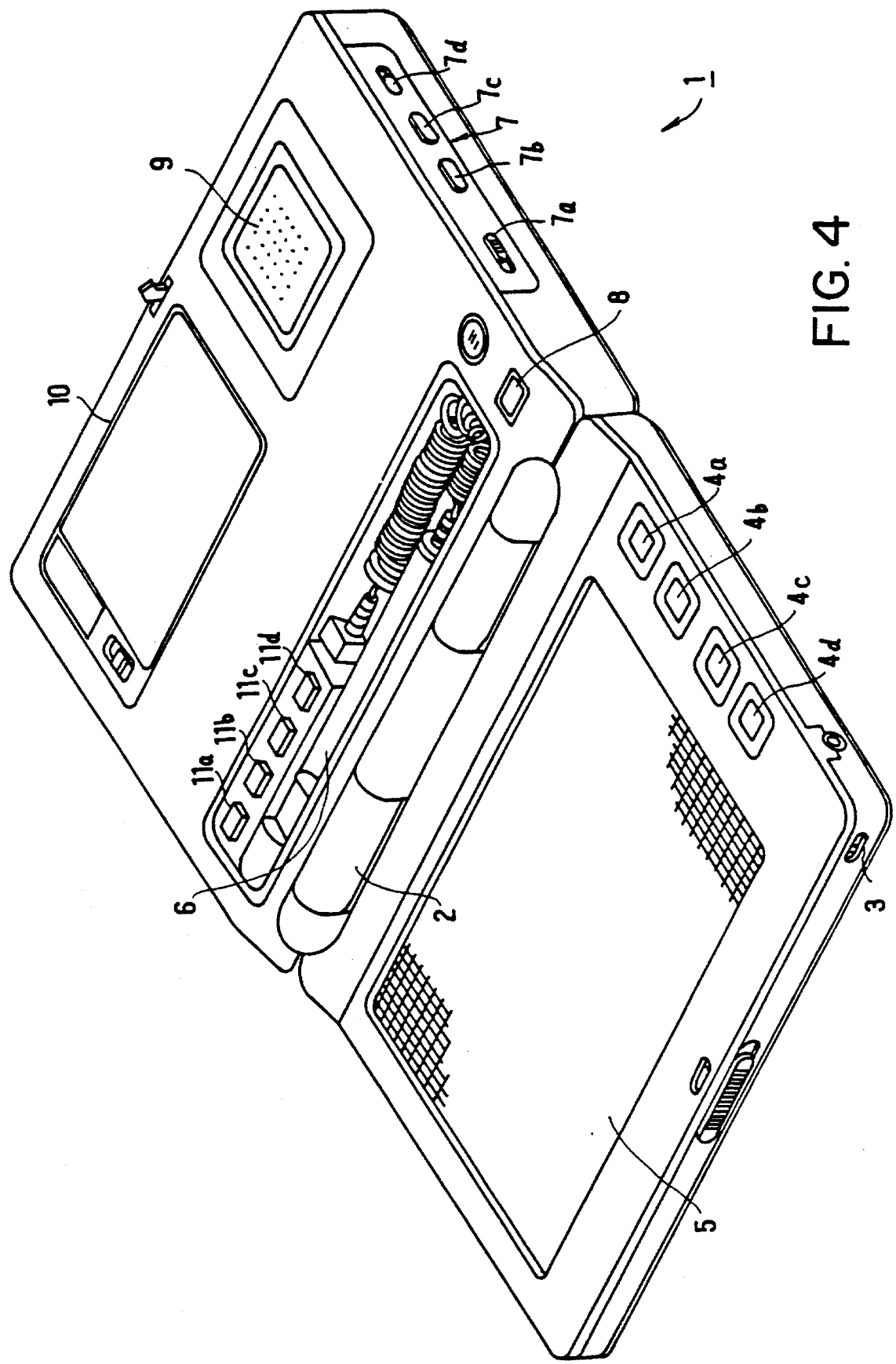
FIG. 4 is a perspective view of an information processing system.

The casing B is provided at its front with a microphone 3, by means of which voice messages can be inputted.

On the upper surface of the casing B, there are arranged key switches 4a to 4d, by which operation of the information processing system 1 can be switched according to requirements.

A liquid crystal display panel 5, which has a transparent electrostatic capacity type tablet mounted on it, is arranged in the casing B. It is possible to display desired personal information through the liquid crystal display panel 5 as well as other displayed items such as windows and icons.

A pen 6, which can be stored in a recess in the casing A when not in use, is penned down on the tablet as a result of which coordinate data is inputted through the tablet. This enables display positions of windows to be switched and personal information to be controlled according to requirements on the basis of the coordinate data.

The casing A is provided at its right side edge with actuating elements 7, which may consist of a recording actuating element 7a, a reproduction actuating element 7b, a stop actuating element 7c and a volume adjustment actuating element 7d; by operating the actuating elements 7, a voice which has been picked up by the microphone 3 can first be recorded and then reproduced.

On the upper surface of the casing A, there is arranged a loudspeaker 9 as well as a power switch 8, and by means of this loudspeaker 9, the voice which has been picked up by the microphone 3 may be monitored. In addition, by placing the mouthpiece of a telephone against the loudspeaker 9, personal information may be transmitted along the telephone line.

Furthermore, on the upper surface of the casing A, there are arranged key switches 11a and 11d in addition to an electric cell receiving portion 10. In addition to the key switches 4a to 4d, these further key switches 11a and 11d enable the operation of the information processing system 1 to be switched according to requirements.

Figure 5:
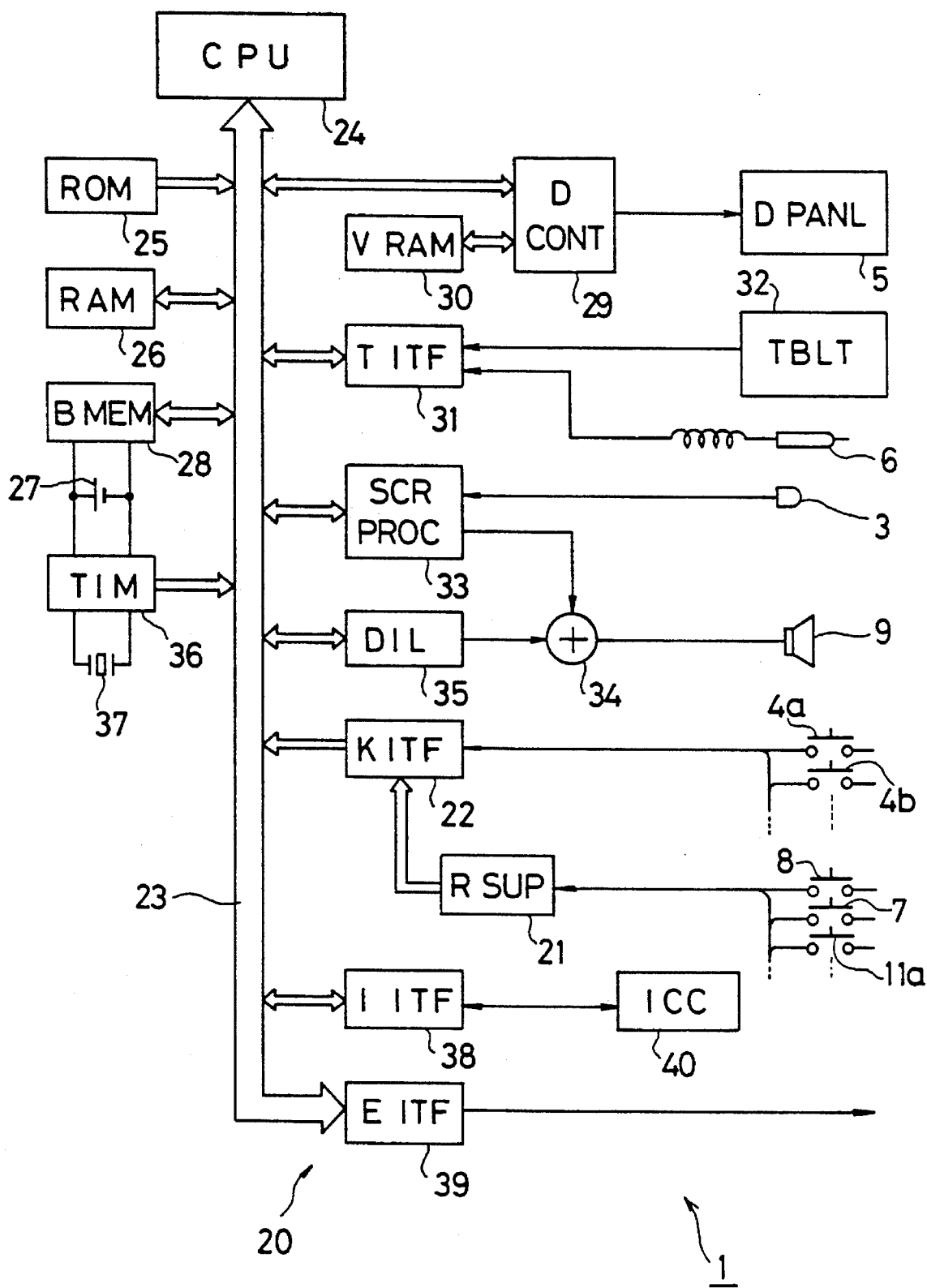
FIG. 5 is a schematic block diagram of the information processing system of FIG. 4.

In a signal processing circuit of the information processing system 1 as shown in FIG. 5, the power switch 8, the actuating elements 7 and the key switches 11a to 11d are connected to a power supply circuit 21, and this enables the information processing system 1 to be turned on by switching the power switch 8 on.

When the actuating elements 7 and the key switches 11a to 11d are activated in addition to the power supply operation, the power supply circuit 21 sends control data to a key interfacing circuit 22.

The key interfacing circuit 22 sends out the control data, which has been sent from the power supply circuit 21, to a central processing unit (CPU) 24 through a bus 23, and the operation of the information processing system 1 is switched as a result.

The key interfacing circuit 22 sends out the control data in a similar manner in the case when the key switches 4a to 4d are turned on, so that the operation of the information processing system 1 is switched in response to the on operation of the key switches 4a to 4d.

The CPU 24 can access a read only memory (ROM) 25 and a random access memory (RAM) 26 through the bus 23, and the processing program of the ROM 25 is executed thereby in response to the operation of the actuating elements.

In this event, the CPU 24 can renew personal information stored in a back-up memory circuit 28 or may register it in the back-up memory circuit 28 by accessing the latter, the back-up memory circuit 28 being connected to a back-up cell 27. The personal information is displayed on the liquid crystal display panel 5 as required.

More specifically, the CPU 24 outputs personal information, which has been accessed according to a processing mode, to a display controller 29, and thereby renews the contents of a video memory circuit (V-RAM) 30, so that the display on the liquid crystal display panel 5 is renewed.

Furthermore, the CPU 24 reads in coordinate data of the pen 6, when penned down on a tablet 32, through a tablet interface circuit 31, and is operable to move a window, for example, to the penned up position or to store the window.

This causes the operation mode of the information processing system 1 to change, for example to switch to a mode of the schedule as described with reference to FIG. 1, and if necessary, a predetermined window W for modifying a schedule, for example, can be displayed by moving the pen 6 along the surface of the tablet 32 to a desired position after the pen 6 is penned down on an icon.

The CPU 24 may also control a solid state component record processing circuit 33 according to the control data outputted from the key interfacing circuit 22, as a result of which a voice message picked up by the microphone 3 is recorded in the back-up memory circuit 28 and, if necessary, reproduced from the loudspeaker 9 through an adder circuit 34.

The CPU 24 additionally controls a dialler circuit 35 which generates dual tone signals of the so-called push phone dialling system to the loudspeaker 9 through the adder circuit 34 on the basis of phone number information which is included in the stored personal information.

The CPU 24 is also provided with the time information from a timer 36 which is maintained actuated by the back-up cell 27 with reference to a crystal resonator 37, and thus personal information, such as the schedule, can be controlled with reference to the time information.

The bus 23 is connected to an integrated circuit (IC) card interface circuit 38 and an extension interface circuit 39. This enhances the processing capacity of the information processing system 1 by allowing an IC card 40 to be connected to the IC interface circuit 38, and enables modem communication through the extension interface circuit 39 according to requirements.

Page selection or turning over operation of the preferred embodiment will now be described.

Figure 7:
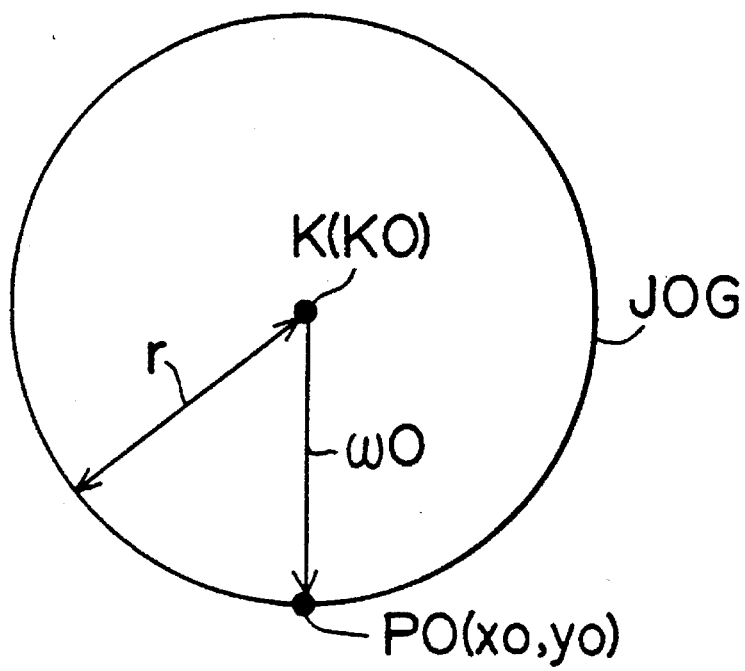
FIGS. 7 to 12 are schematic diagrams illustrating various aspects of the operation thereof.

If after having been penned down on a predetermined icon, the pen 6 is moved to a display area ARDP (FIG. 1) of the following page data in a condition that a desired page is displayed as well as a scroll bar, in this embodiment the CPU 24 is operable to cause a jog dial JOG to be displayed at that position of the pen, as shown in FIG. 7.

Figure 6A:
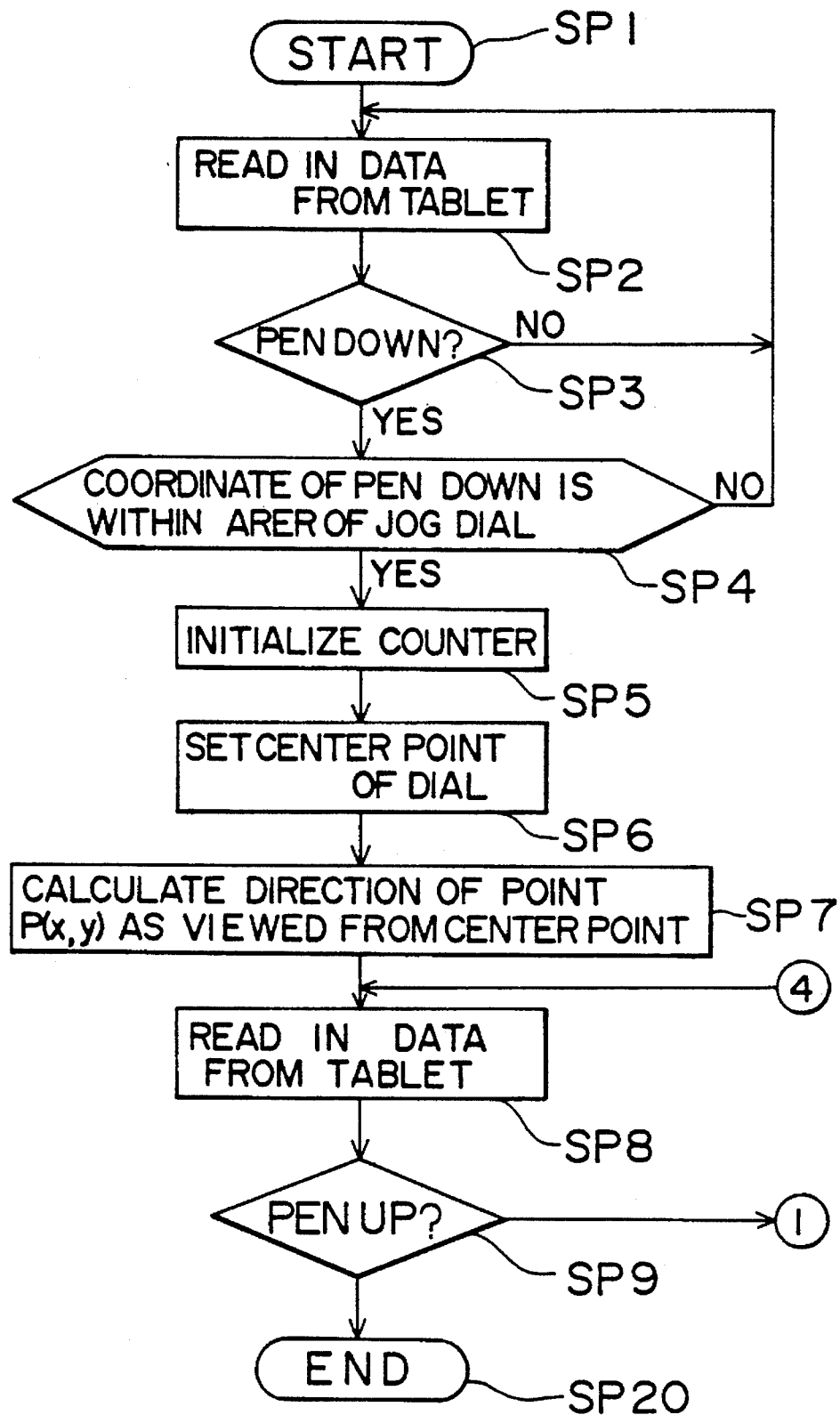
FIG. 6 (formed of FIGS. 6A to 6C) is a flow chart illustrating the operation of page selection according to one embodiment of the present invention.
Figure 6B:
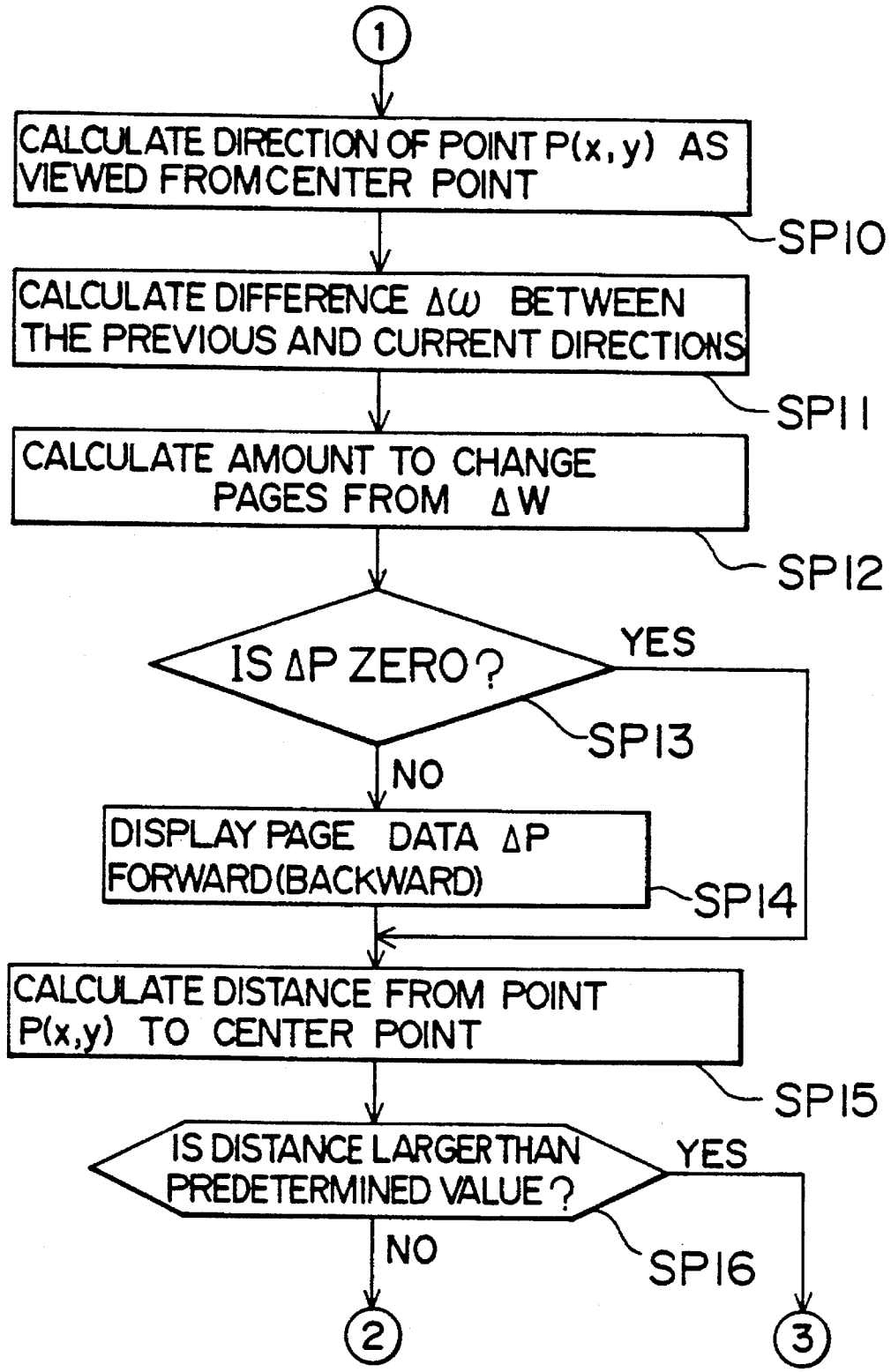
Figure 6C:
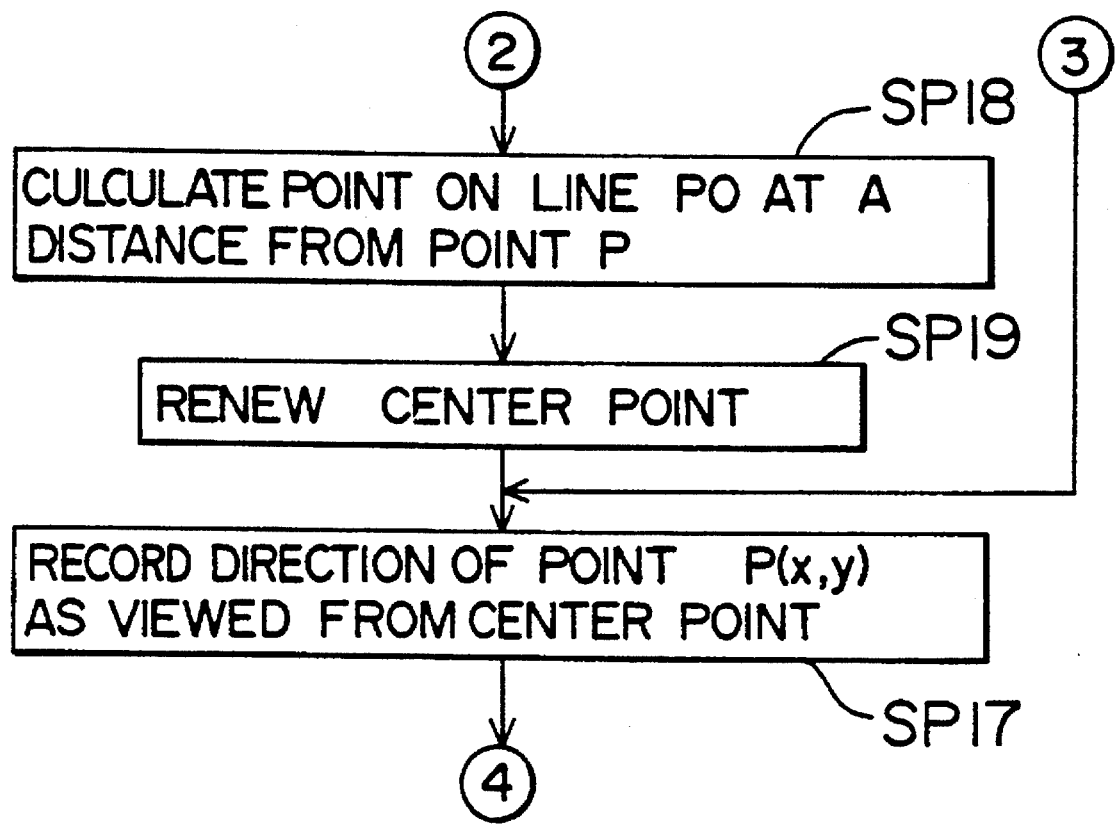

In this state, the CPU 24 executes the routine shown in FIG. 6, and thus turning over of pages can be performed by switching the display screen to the user's desired page.

More specifically, the CPU 24 moves from a 'start' step SP1 to a step SP2 in which the coordinate data of the pen 6 is detected by reading in the coordinate data from the tablet interface circuit 31.

The CPU 24 then proceeds to a step SP3, where on the basis of the output data from the tablet interface circuit 31 it is judged whether or not the pen 6 has been penned down.

If a negative result is obtained in the step SP3, the CPU 24 returns to the step SP2, and thus the loop of the steps SP2-SP3-SP2 is repeated until the pen 6 is penned down.

When the pen 6 has been penned down, an affirmative result is obtained in the step SP3, and therefore the CPU 24 goes to a step SP4 in which it is judged whether or not the coordinate data x0 and y0 read in the step SP2 satisfy the following equation:

$$(x0-xc)^2+(y0-yc)^2=r^2 \qquad (1)$$

where xc and yc represent coordinate data of the centre K of the displayed jog dial JOG, and r represents the radius of the jog dial JOG. Thus, it is judged whether or not pen-down has taken place on the displayed jog dial JOG.

When a negative result is obtained in the step SP4, the CPU 24 returns to the step SP2, and thus the loop of the Steps SP2-SP3-SP4-SP2 is repeated until the pen 6 has been penned down on the jog dial JOG.

When the pen 6 has been penned down on the Jog dial JOG, an affirmative result is obtained in the step SP4, and thus the CPU 24 goes to a step SP5 in which a counter is cleared. Then, the CPU 24 goes to a step SP6 in which it sets the coordinate data xc and yc of the centre K of the jog dial JOG to default values xc0 and yc0 of the centre point K0, and then goes to a step SP7 in which the direction ω0 (expressed as an angle with a predetermined reference rotational direction) from the point K0 towards the pen-down point P0 (coordinate data x0 and y0) is detected and the result of the detection is stored in the register.

Figure 8:
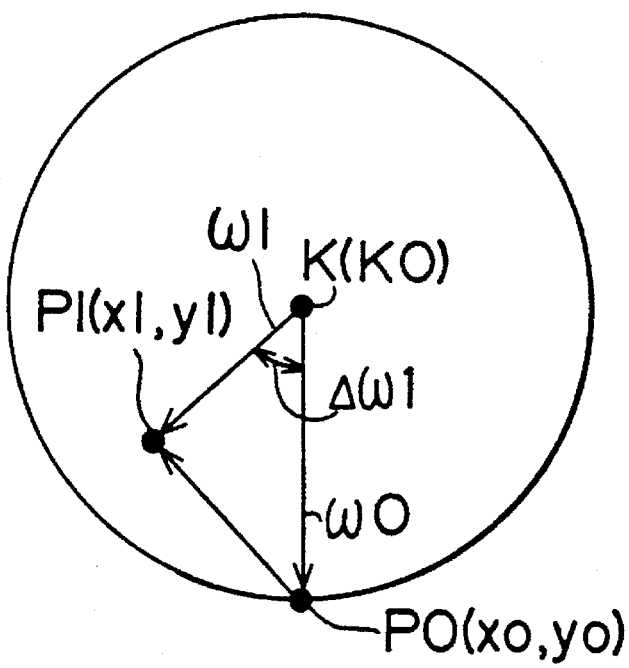

Subsequently, the CPU 24 goes to a step SP8, where as shown in FIG. 8, coordinate data x1 and y1 are accepted from the tablet interface circuit 31. Then, in a step SP9, it is judged whether or not penning up has taken place.

If a negative result is obtained in the step SP9, the CPU 24 goes to a step SP10 to detect a direction ω1 of the point P1 of the coordinate-data x1 and y1 as viewed from the centre point K0, and then proceeds to a step SP11, in which an angle Δω1 between the directions ω0 and ω1 is detected by executing the following equation:

$$\Delta\omega 1 = \omega 1 - \omega 0 \qquad (2)$$

This enables the CPU 24 to detect on the basis of the centre point K0 the amount of rotation of the pen 6 after pen-down on the jog dial JOG has taken place.

When the angle Δω1 is detected, the CPU 24 goes to a step SP12 in which the following equation is executed:

$$\Delta P = \frac{\omega 1}{45} \qquad (3)$$

and thus the number ΔP of pages the angle Δω1 corresponds to is detected on the basis of 45° per page.

Then, the CPU 24 proceeds to a step SP13, where it is judged whether the number of pages ΔP detected in the step SP12 is zero or not. When a negative result is obtained, the CPU 24 goes to a step SP14 to output personal information of the page, which is opened by turning over ΔP pages from the displayed page, to the display controller 29.

This causes the page advanced by ΔP pages to be displayed when the user turns the pen 6 in the clockwise direction on the jog dial JOG. On the other hand, when the pen 6 is rotated in the anticlockwise direction, the page preceded by the number ΔP of pages is displayed. Thus pages are turned over in proportion to the rotation of the pen 6.

Simultaneously, the CPU 24 switches the display of the scroll bar by the number of pages turned over, and the display of the scroll bar is thereby renewed.

In this manner, the angle Δω is detected by sequentially detecting the coordinate data on the tablet 32, and by repeated turning over of pages by the angle Δω it is possible to turn over pages as if an actual jog dial has been operated. Thus, the information processing system 1 is enhanced in use.

In the case where a jog dial JOG is displayed on a display panel as in this embodiment and the pen 6 is rotated on the jog dial JOG, the user might operate the pen 6 while, for example, watching the display of the scroll bar rather than the jog dial JOG.

Figure 9:
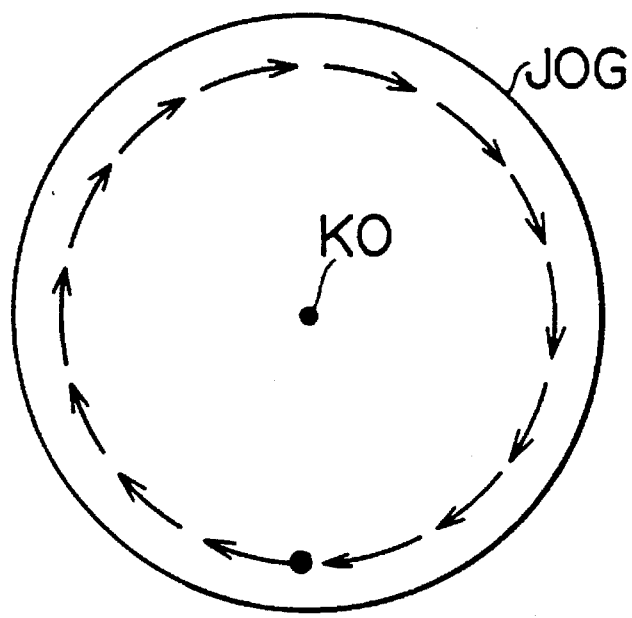
Figure 10:
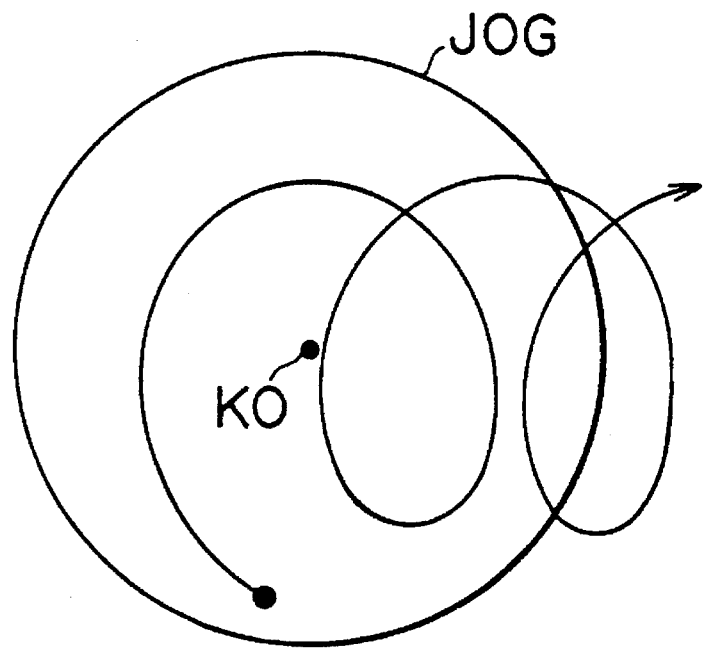

In such a case, as shown in FIGS. 9 and 10, the pen 6 does not follow a single locus along the circumference of the circle of the jog dial JOG, but various loci of which the centre gradually move as the pen 6 moves.

Figure 11:
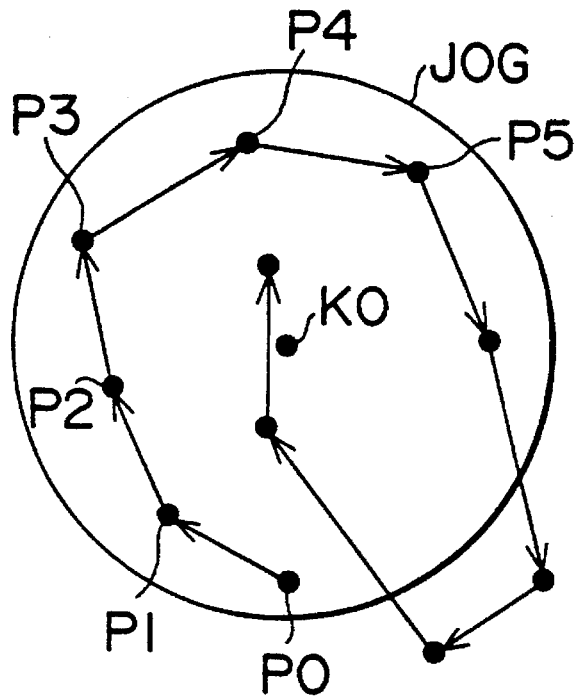

Thus, as shown in FIG. 11, coordinate data inputted through the tablet 31 is inputted so as to move towards or away from the centre point K0. It is therefore not possible to turn over a number of pages to correspond to the user's intention by detecting the rotational operation amount solely with reference to the centre point K0.

In the case when the centre of rotation is moved excessively, the direction of the change of the angle can be detected in the opposite direction about the centre point K0, and hence it may be difficult to turn over pages as desired.

In order to avoid this, in this embodiment the centre point K0 is renewed to correspond to the distance from the centre point K0 to each point P1, P2, . . . , and thereby a number of pages which correspond to the user's intended operation are turned over.

More specifically, in a step SP15, the CPU 24 executes the operation of the following equation:

$$d^2 = (x1-xc)^2 + (y1-yc)^2 \qquad (4)$$

and the square $d^2$ of the distance d from the centre point K0 to the point P1 is thereby detected. Then, the CPU 24 proceeds to a step SP16 in which it is judged whether or not the following equations are satisfied:ps $$d^2 > D^2 \qquad (5)$$

$$D = r \qquad (6)$$

and thus it is judged whether or not the distance d is larger than the predetermined value (in this case the value r represented by the equation (6)).

As shown in the example of FIG. 8, the point P1 is within the jog dial JOG, and hence an affirmative result is obtained. Thus, CPU 24 goes to a step SP17, the register being renewed from the direction ω0 to the direction ω1. Thereafter, the CPU 24 returns to the step SPa.

Figure 12:
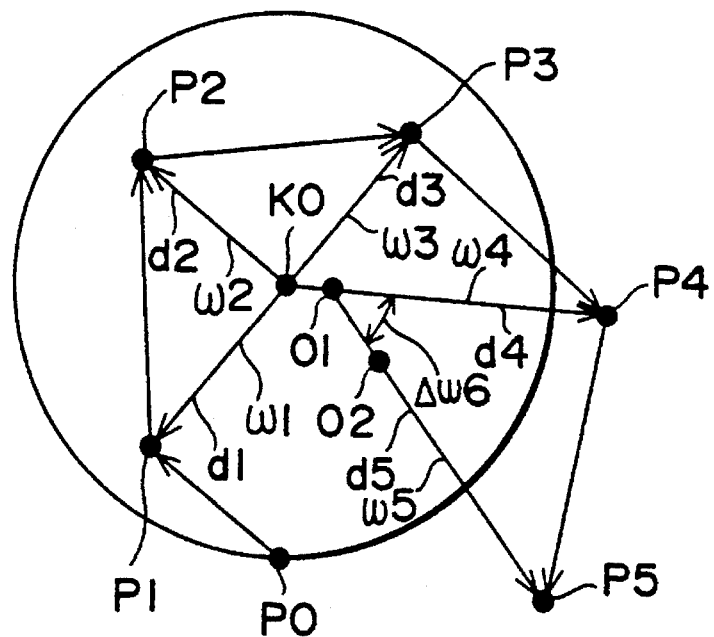

Therefore, as shown in FIG. 12, the CPU 24 repeatedly performs the steps SP8-SP9-SP10-SP11-SP12-SP13-SP15-SP16-SP17 on a subsequent point P2, and the coordinate data x2 and y2 of the point P2 is read in to detect the direction ω2. Then, the angle ω2 is detected from the direction ω2 and the direction ω1 in the register.

Furthermore, pages are turned over according to the angle Δω2, and the it is judged whether the distance d2 from the centre point K0 to the point P2 satisfies the equation (5), after which the CPU 24 proceeds to the step SP17.

In this manner, the CPU 24 sequentially performs turning over of pages on the basis of coordinate data of the points P0, P1, P2, P3 and P4, and judges whether or not the distances d1, d2, d3 and d4 to the centre point K0 are smaller than the predetermined value.

When as in the point P4 shown in FIG. 12, coordinate data is detected outside the circumference of the jog dial JOG by moving the locus of the pen 6, a negative result is obtained in the step SP16, and thus the CPU 24 proceeds to a step SP18.

In the step SP18, the CPU 24 detects coordinate data xc1 and yc1 which is away from the point P4 at a distance of r on the line between the centre point K0 and the point P4, and then proceeds to a step SP19, where a new centre point K1 is set at the position of the coordinate data xc1 and yc1.

Even if the centre of the rotation of the pen 6 is moved during operation of the pen 6, this enables the centre point to be modified according to the displacement of the centre.

When the centre point K1 is renewed, the CPU 24 proceeds to the step SP17 in which the direction ω4 from the centre point K1 towards the point P4 is detected again. The contents of the register are renewed to the detected direction ω4.

With reference to the subsequent point P5, the direction ω5 is detected on the basis of the renewed centre point K1, and then the angle Δω5 between the re-detected direction ω4 and ω5 is detected. Thus, turning over of pages is performed according to the angle Δω5.

Even if the rotational centre of the pen 6 is moved, the rotational amount can be detected to correspond to the movement of the rotational centre by renewing the centre point K according to the distance d to the centre point. Thus, it is possible to turn over a number of pages as required by the user.

Moreover, even in the case of excessive displacement of the rotational centre, turning over of the desired number of pages can still be achieved.

It is possible to obtain high accuracy measurement results, which match the user's intended operation, with a simple construction by detecting a change in angle to the centre point, effectively renewing the centre point in this fashion.

Thus, in the CPU 24, turning over of pages is achieved on the basis of coordinate data sequentially inputted. When pen-up takes place, an affirmative result is obtained in the step SP9, so that the routine is terminated in a step SP20.

In this embodiment, the tablet 32 and the tablet interface circuit 31 constitute coordinate data inputting means which sequentially inputs the coordinate data by operation of the pen 6 which forms the moving member, the coordinate data corresponding to the positions of the movable member. The CPU 24 constitutes angle detection means for detecting a change in angle from the centre point as the predetermined reference position towards the position of the movable member on the basis of the coordinate data.

In the above-described system, the operation mode thereof is switched by turning on the key switches 4a to 4d and 11a to 11d, and the desired personal information is displayed on the display panel 5 together with the scroll bar. In this state, the pen 6 is penned down on a predetermined icon, and is then moved to the display area ARDP, causing the jog dial JOG to be displayed at the travelled position.

When the pen 6 is moved along the jog dial JOG in a direction to turn over pages after having been penned down within the jog dial JOG in this state, coordinate data of the pen 6 is consecutively detected.

On the basis of the coordinate data, a change in angle of the direction of the pen 6 from the centre point is detected, and a number ΔP of pages corresponding to the amount of the change in angle are turned over.

Thus, pages can be turned over with a simple operation as if an actual jog dial JOG is being operated, and hence the information processing system 1 is improved in use.

For each coordinate data, the distance d to the centre point K is detected. When the distance d is larger than a predetermined value D (=r), the centre point is renewed, and on the basis of the centre point a change in angle of the direction of the pen 6 is detected.

Thus, even if the rotational centre of the pen 6 is moved, the operation amount can be detected by renewing the centre point according to the movement.

In the foregoing embodiment, an electrical capacitance tablet is used, but the present invention is not limited to this type of tablet. Other coordinate input means, such as a write pen, a mouse or a pressure sensitive tablet, may instead be used. In these cases, the write pen and the mouse constitute the movable member for inputting coordinate data.

In the above description of the embodiment, it is stated that the centre point is renewed when the distance d to the centre point K becomes larger than the radius r of the jog dial. The present invention is not limited to this, and the centre point may be renewed if the distance becomes larger than a different value, for example r/3.

Alternatively, the centre point may be reset on an extended line which interconnects each point P to the centre point when the distance d becomes smaller than a predetermined value.

In addition, in the embodiment previously described, the present invention is applied to an information processing system which controls personal information. However, the present invention may instead be applied to other cases: for example, to a word processor for turning over pages; to the formation of a bar chart or the like; or to the remote control commander of a video tape recorder for frame advancing or variable speed reproduction.

I claim:

1. An information processing apparatus comprising:
   a) coordinate data input means comprising a tablet for inputting said coordinate data according to a position of a movable pen member, and means for detecting coordinate data corresponding to a center point, and means for detecting coordinate data according to movement of said movable pen member relative to said center point;
   b) detecting means positioned under said table and for detecting an angle between said movable pen member and said center point based on said coordinate data;
   c) processing means for processing said coordinate data for changing a condition of a predetermined function in response to said angle;
   d) image generating means positioned under said tablet and comprising a display for generating a dial-like circle-shaped image for illustrating a rotating angle of said movable member; and
   e) means for changing said image generated by said display, in response to data input by said tablet,
   f) when said pen is penned down to a predetermined area of said image, said processing means is changed to a mode for detecting a rotational angle,
   when said pen is operated to trace said circular image in a clockwise sense, said predetermined function is set to increase, and when said pen is operated to trace said circular image in an anti-clockwise sense, said predetermined function is set to decrease, and
   when a distance between said coordinate data of said position of said pen and said center point is greater than a predetermined distance, said processing means is operable to change coordinate data of said center point of said circular image.

2. Apparatus according to claim 1 wherein said predetermined function is turning a page image on said display (5) for use in electronic memorandum apparatus.

3. An information processing apparatus comprising:
   a) coordinate data input means comprising a tablet for inputting said coordinate data according to a position of a movable member and means for detecting coordinate data corresponding to a center point and means for detecting coordinate data according to movement of said movable member relative to said center point;
   b) detecting means for detecting an angle between said movable member and said center point based on said coordinate data;

c) processing means for processing said coordinate data for changing a condition of a predetermined function in response to said angle;

d) image generating means comprising a display for generating a dial-like circle-shaped image having a center for illustrating a rotating angle of said movable member; and e) means for changing said image generated by said display, in response to data input by said tablet, wherein the position of said center of said circle-shaped image is selectively renewed in response to data input from said tablet.

* * * * *